US008218768B2

(12) United States Patent
Rezaiifar et al.

(10) Patent No.: US 8,218,768 B2
(45) Date of Patent: Jul. 10, 2012

(54) CRYPTOSYNC DESIGN FOR A WIRELESS COMMUNICATION SYSTEM

(75) Inventors: Ramin Rezaiifar, San Diego, CA (US); Paul E. Bender, San Diego, CA (US); Roy Franklin Quick, Jr., San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 856 days.

(21) Appl. No.: 10/106,971

(22) Filed: Mar. 25, 2002

(65) Prior Publication Data
US 2003/0206538 A1 Nov. 6, 2003

Related U.S. Application Data

(60) Provisional application No. 60/348,968, filed on Jan. 14, 2002.

(51) Int. Cl.
*H04L 29/06* (2006.01)
(52) U.S. Cl. ......... 380/270; 380/255; 380/280; 380/43; 380/262; 380/278; 726/2; 726/3; 726/4; 726/5; 713/150; 370/468; 370/464; 370/465
(58) Field of Classification Search .................. 380/270, 380/274; 370/335, 338
See application file for complete search history.

(56) References Cited

U.S. PATENT DOCUMENTS

| | | | | |
|---|---|---|---|---|
| 5,142,578 A | * | 8/1992 | Matyas et al. ................ | 380/280 |
| 5,467,398 A | * | 11/1995 | Pierce et al. .................... | 380/44 |
| 6,028,933 A | * | 2/2000 | Heer et al. ..................... | 713/169 |
| 6,028,966 A | | 2/2000 | Hashimoto | |
| 6,055,316 A | * | 4/2000 | Perlman et al. ................ | 380/262 |
| 6,697,490 B1 | * | 2/2004 | Mizikovsky et al. ........ | 380/262 |
| 6,782,473 B1 | * | 8/2004 | Park .............................. | 713/160 |
| 6,898,285 B1 | * | 5/2005 | Hutchings et al. ............ | 380/200 |
| 7,095,856 B2 | * | 8/2006 | Logalbo et al. ............... | 380/274 |
| 7,200,115 B2 | * | 4/2007 | Khan et al. ..................... | 370/236 |
| 7,620,181 B2 | * | 11/2009 | Bicksler et al. ............... | 380/221 |

(Continued)

FOREIGN PATENT DOCUMENTS
WO 01/56249 A1 8/2001

OTHER PUBLICATIONS

3GPP2, CDMA2000 High Rate Packet Data Air Interface Specification, Sep. 12, 2000, pp. 7-1-7-30.*

(Continued)

*Primary Examiner* — Syed A. Zia
(74) *Attorney, Agent, or Firm* — Won Tae Kim

(57) ABSTRACT

A cryptosync design comprising (1) a channel identifier indicative of a particular channel via which a data packet is sent, (2) an extended time stamp indicative of a time value associated with the data packet, and (3) a counter indicative of a packet count associated with the data packet. The lengths of the extended time stamp and counter fields and the time unit for the extended time stamp are parameters that may be configured for each channel. At the sender, the extended time stamp for the cryptosync may be obtained from the System Time maintained by the sender. The counter value for the cryptosync may be provided by a counter that is maintained for the channel by the sender. The sender may include a time stamp and/or the counter value, if they are needed to derive the cryptosync at the receiver, in a header of the data packet.

33 Claims, 6 Drawing Sheets

U.S. PATENT DOCUMENTS

| | | | |
|---|---|---|---|
| 7,831,825 B2* | 11/2010 | Milliken et al. | 713/160 |
| 8,077,679 B2* | 12/2011 | Leung | 370/335 |
| 2001/0052072 A1* | 12/2001 | Jung | 713/160 |
| 2002/0141365 A1* | 10/2002 | Leung | 370/335 |
| 2002/0141371 A1* | 10/2002 | Hsu | 370/338 |
| 2002/0141447 A1* | 10/2002 | Leung et al. | 370/469 |
| 2007/0198910 A1* | 8/2007 | Jensen et al. | 715/505 |

OTHER PUBLICATIONS

3GPP2, CDMA2000 High Rate Packet Data Air Interface Specification, Sep. 12, 2000, pp. 1-1-1-6.*

3rd Generation Partnership Project 2: "cdma2000 High Rate Packet Data Air Interface Specification" 3GPP2 C.S0024, Oct. 27, 2000, pp. 63-81.*

Blom et al. "The Secure Real Time Transport Protocol" Internet-Draft, Internet Engineering Task Force, AVT Working Group, Online! Jul. 7, 2001, pp. 1-32, Retrieved from the Internet: <URL: http://www.cs.utk.edu/ (moore/ID-PDF/draft-ietf-avt-srtp-01.pdf> 'retrieved on Jun. 24, 2003.

$3^{rd}$ Generation Partnership Project 2: "Enhanced Subscriber Privacy for cdma2000 High Rate Packet Data," 3 GPP2, Standard C. S0039, Version 1.0, Sep. 13, 2002, pp. 1-40.

3GPP2 C.S0024 "cdma2000 High Rate Packet Data Air Interface Specification," version 2, Oct. 27, 2000 (IS-856 Standard).

International Search Report—PCT/US03/000496, International Search Authority—European Patent Office, Jul. 15, 2003.

3rd Generation) Partnership Project 2, Upper Layer (Layer3) Signaling Standard for cdma2000 Spread Spectrum Systems, [online], Jun. 9, 1999, pp. 24-26, (Revised on Jul. 3, 2009), Retrieved from the Internet: <URL: http://www.3gpp2.org/public_html/specs/C.S0005-A.pdf>.

* cited by examiner

CRYPTOSYNC DESIGN FOR A WIRELESS COMMUNICATION SYSTEM

CROSS REFERENCE

This application claims priority from Provisional Application No. 60/348,968, filed Jan. 14, 2002, entitled "Cryptosync Design for Enhanced Security in IS-856."

BACKGROUND

1. Field

The present invention relates generally to data communication, and more specifically to a cryptosync design suitable for use in a wireless communication system (e.g., an IS-856 CDMA system).

2. Background

Wireless communication systems are widely deployed to provide various types of communication such as voice, packet data, and so on. These systems may be multiple-access systems capable of supporting communication with multiple users, and may be based on code division multiple access (CDMA), time division multiple access (TDMA), frequency division multiple access (FDMA), or some other multiple access techniques. CDMA systems may provide certain advantages over other systems, such as increased system capacity.

For some applications, security is not necessary and data may be transmitted in the clear (i.e., without encryption) between an access terminal and an access network. However, for certain other applications, "sensitive" data may be transmitted over the air. Examples of such sensitive data include personal information, credit card information, account information, and so on. For sensitive data, encryption may be used to provide security for the over-the-air transmission.

Numerous encryption algorithms are available to encrypt data. For many algorithms, a security key is used in conjunction with a "cryptosync" to generate a mask that is then used to encrypt the data. The security key is an important aspect of the encryption process, and various techniques have been devised to exchange and maintain the key in secrecy. The security key is typically a static value, and the cryptosync is used to modify the security key so that the resultant mask has a different value each time the key is used. For example, if encryption is to be performed on each packet of data, then the cryptosync may be used to generate a new mask for each data packet based on the same security key. This then prevents discovery of the contents of the packet or compromising the security key based on packets that have been encrypted using the same key.

An important property of the cryptosync is its variability (per encryption attempt), which is characterized by a new cryptosync value being provided each time the security key is used. One technique for generating cryptosync is with a timer that keeps track of time based on some absolute time reference. For this technique, the cryptosync may be set equal to the current time, as provided by the timer, when the cryptosync is needed. To ensure proper generation of the cryptosync, the timer needs to have the required resolution, which is determined by the rate at which the security key is used (e.g., the rate of the data packet), so that duplicate time values are not used for the cryptosync. The design of various entities (e.g., the base station controller) in the communication system may be impacted by the need to maintain a (relatively) fine time resolution for the packets.

Another technique for generating cryptosync is with a counter that is incremented each time the security key is used (e.g., for each packet to be encrypted). To ensure that the same cryptosync values are used at both the sender and receiver for a given packet, the counters at these two entities need to be synchronized. Moreover, certain restrictions may be imposed on when the counters may be reset to ensure that duplicate counter values are not used. These requirements may complicate the generation of cryptosync based solely on a counter.

There is therefore a need in the art for a cryptosync design that has the desired variability property and avoids the disadvantages described above for timer-only based and counter-only based cryptosync designs.

SUMMARY

A cryptosync design is provided herein that may be used for "secured processing" in various wireless communication systems, such as IS-856 CDMA systems. The secured processing may include authentication, encryption, decryption, and so on, or a combination thereof.

In a specific design, the cryptosync has a structure that comprises three fields: a channel identifier, an extended time stamp, and a counter. The channel identifier is indicative of a particular channel via which a data packet is sent. The extended time stamp is indicative of a time value associated with the data packet (e.g., the time when the packet is going to be transmitted) and is provided with a particular time unit. The counter is indicative of a packet count associated with the data packet. In an embodiment, the lengths of the extended time stamp and counter fields and the time unit used for the extended time stamp are configurable parameters. These parameters may be independently configured for each channel that may be used for communication between an access terminal and an access network.

A cryptosync may be derived at both the sender and receiver for each packet to be encrypted and/or authenticated. The cryptosync is used at the sender to perform encryption and/or authentication of the packet. The same cryptosync is also used at the receiver for the complementary decryption and/or authentication of the packet.

At the sender, the extended time stamp for the cryptosync may be obtained from the System Time maintained by the sender. The counter value (if any) for the cryptosync may be provided by a counter that is maintained for the channel by the sender. The sender may also include a time stamp and/or the counter value, if they are needed by the receiver to derive the cryptosync, in a header of the packet to be transmitted.

At the receiver, the time stamp and counter value (if any) included in the header of a received packet may be extracted and used to derive the cryptosync. At the receiver, the extended time stamp for the cryptosync may be derived from either (1) the time stamp included in the received packet or (2) the System Time maintained by the receiver. The counter value (if any) for the cryptosync is set to the counter value extracted from the received packet header.

Various aspects and embodiments of the invention are described in further detail below. The invention further provides methods, program codes, digital signal processors, electronic units, receiver units, transmitter units, access terminals, access points, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Cryptosyncs are externally-provided synchronizing information for crypto algorithms (ciphers) that allows an encryptor at one end to uniquely encrypt each block of content into ciphertext, and yet allows a decryptor at the other end to properly decrypt the ciphertext to yield the original plaintext. Cryptosyncs are also known as Initialization Vectors (IV). The purpose of the cryptosync is to ensure that identical plaintext blocks do not encrypt to the same ciphertext. For example, it is highly desirable to hide the fact that message_a and message_b start the same way. Without cryptosyncs the beginning of the ciphertext for both messages will be the same, unless the encryption algorithm maintains some state based on the previous ciphertext bits. Self-synchronizing stream ciphers are an example of such state-based encryption mechanisms.

In wireless communication systems it is inevitable that some packets will be lost over-the-air (i.e., received in error or "erased"). If packet 'n' is erased, then the encryption of the subsequent packets will fail if the decryption is "state-full" and relies on the ciphertext from the previous packets. Hence, it is desirable to provide the cryptosync that is used for encryption of a packet explicitly to the receiver in order to make it possible for the receiver to decipher the packet independently.

The cryptosync design described herein may be used for various wireless communication systems. For example, this cryptosync design may be used for CDMA, TDMA, and other systems. The CDMA system may also implement one or more CDMA standards, such as IS-856, IS-2000, IS-95, W-CDMA, and so on. These various CDMA standards are known in the art and incorporated herein by reference. For clarity, various aspects and embodiments are specifically described for a CDMA system that implements IS-856 (i.e., an IS-856 system). The IS-856 standard is described in document 3GPP2 C.S0024, entitled "cdma2000 High Rate Packet Data Air Interface Specification," version 2.0, Oct. 27, 2000, which is incorporated herein by reference. This specific version of the IS-856 standard is hereinafter referred to as the "IS-856 Specification".

Figure 1:
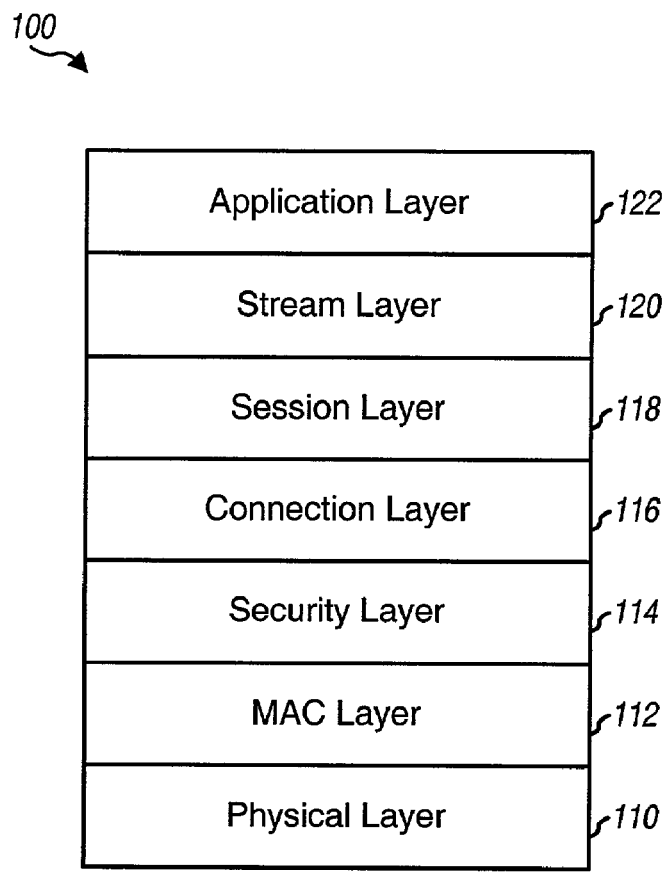
FIG. 1 is a diagram of an air interface layering architecture defined by IS-856.

FIG. 1 is a diagram of an air interface layering architecture 100 defined by IS-856. Layering architecture 100 is used to support communication between an access terminal (or simply, a terminal) and a radio network in the IS-856 system. As shown in FIG. 1, layering architecture 100 comprises seven layers, which are identified as: a Physical Layer 110, a Medium Access Control (MAC) Layer 112, a Security Layer 114, a Connection Layer 116, a Session Layer 118, a Stream Layer 120, and an Application Layer 122. A short description for each of these layers is provided below.

Physical Layer 110 defines the "physical" characteristics of the transmission between an access terminal and a radio network. These physical characteristics may include, for example, the channel structure, the transmission frequency, the output transmit power level, the modulation format, the encoding scheme, and so on, for the forward and reverse links. MAC Layer 112 defines the procedures used to transmit and receive data over the Physical Layer. Security Layer 114 provides secured services, which may include, for example, authentication and encryption services. Connection Layer 116 provides air-link connection establishment and maintenance services. Session Layer 118 provides layer and protocol negotiation, protocol configuration, and state maintenance services. Stream Layer 120 provides multiplexing of various application streams. Application Layer 122 provides multiple applications such as, for example, signaling application for transporting air interface protocol messages, packet application for transporting user traffic data, and so on. The layers of layering architecture 100 are described in detail in the IS-856 Specification.

Figure 2:
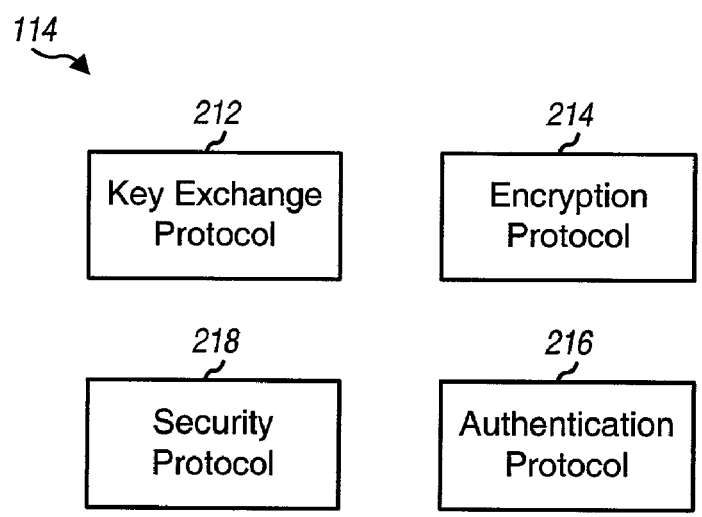
FIG. 2 is a diagram of the protocols for the Security Layer defined by IS-856.

FIG. 2 is a diagram of the four protocols for Security Layer 114 defined by IS-856. As shown in FIG. 2, Security Layer 114 includes a Key Exchange Protocol 212, an Encryption Protocol 214, an Authentication Protocol 216, and a Security Protocol 218. Key Exchange Protocol 212 provides the procedures followed by the access terminal and access network to exchange security keys used for encryption and authentication. Encryption Protocol 214 provides the procedures to be followed for encrypting data. Authentication Protocol 216 provides the procedures to be followed for authenticating data. Security Protocol 218 provides public variables (e.g., cryptosync, timestamp, and so on) needed by Encryption Protocol 214 and Authentication Protocol 216. These various protocols for Security Layer 114 are also described in detail in the IS-856 Specification.

The Key Exchange, Encryption, Authentication, and Security Protocols may each be configured during the establishment of a communication session between the access terminal and access network. Thereafter, during the session, each of these protocols operates in the configured manner.

Figure 3:
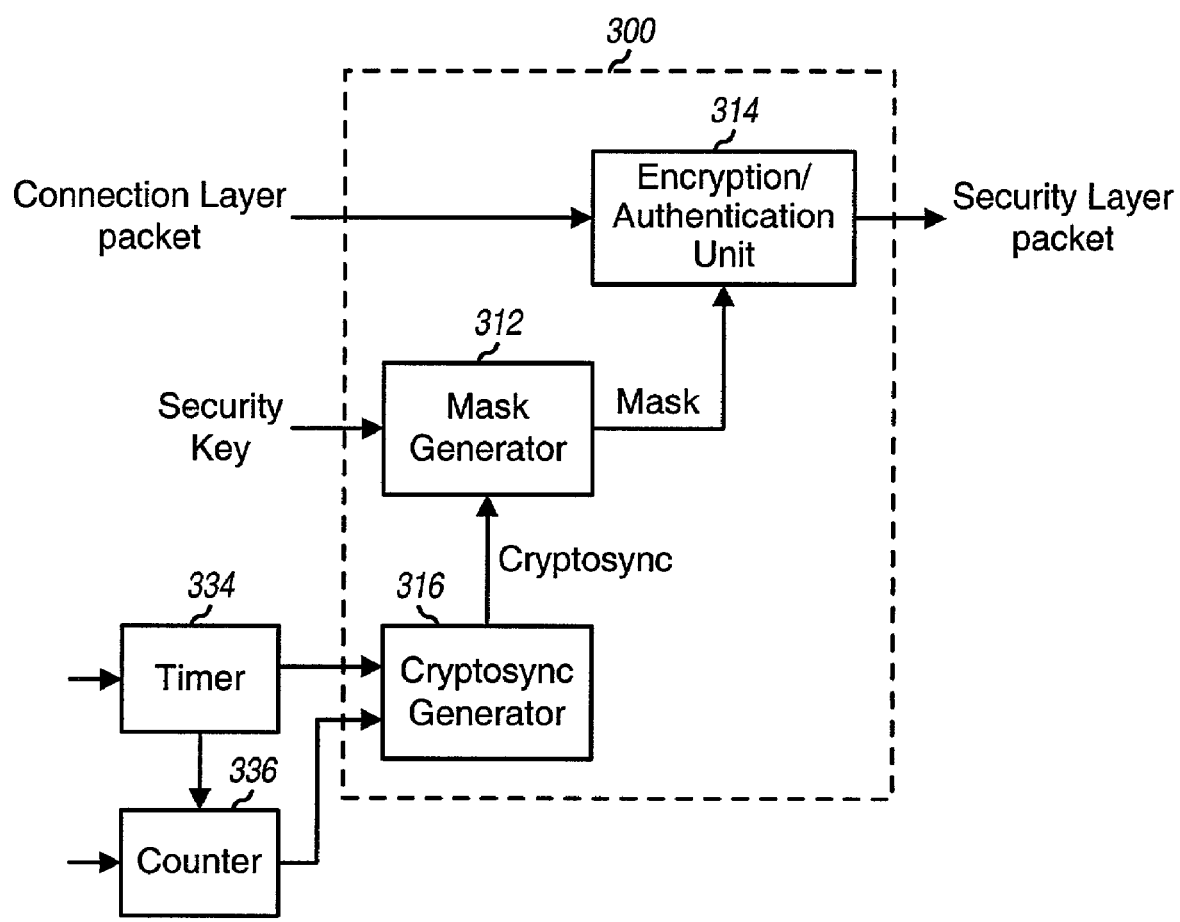
FIG. 3 is a block diagram of an embodiment of a security processor.

FIG. 3 is a block diagram of an embodiment of a security processor 300. At the sender, a security key and a cryptosync are provided to a mask generator 312, which generates a mask based on these two inputs. The mask is then provided to an encryption/authentication unit 314, which also receives the data to be encrypted and/or authenticated. For IS-856, the encryption and authentication are performed (if at all) on each Connection Layer packet. Unit 314 may encrypt the packet based on the mask and a particular encryption algorithm. Alternatively or additionally, unit 314 may generate a signature based on the content of the packet, the mask, and a particular authentication algorithm. The signature may be appended to the packet and used at the receiver to authenticate the source of the packet. The specific design of mask generator 312 and encryption/authentication unit 314 is dependent on the particular encryption and/or authentication algorithm being implemented. A security processor at the receiver performs the complementary authentication and/or decryption of the received packet.

As shown in FIG. 3, at the sender, the cryptosync is generated by a cryptosync generator 316 based on a value from a timer 334 and possibly a value from a counter 336. Timer 334 may be reset based on a system control, and counter 336 may be reset based on an output from timer 334. The cryptosync generation is described in further detail below.

Figure 4:
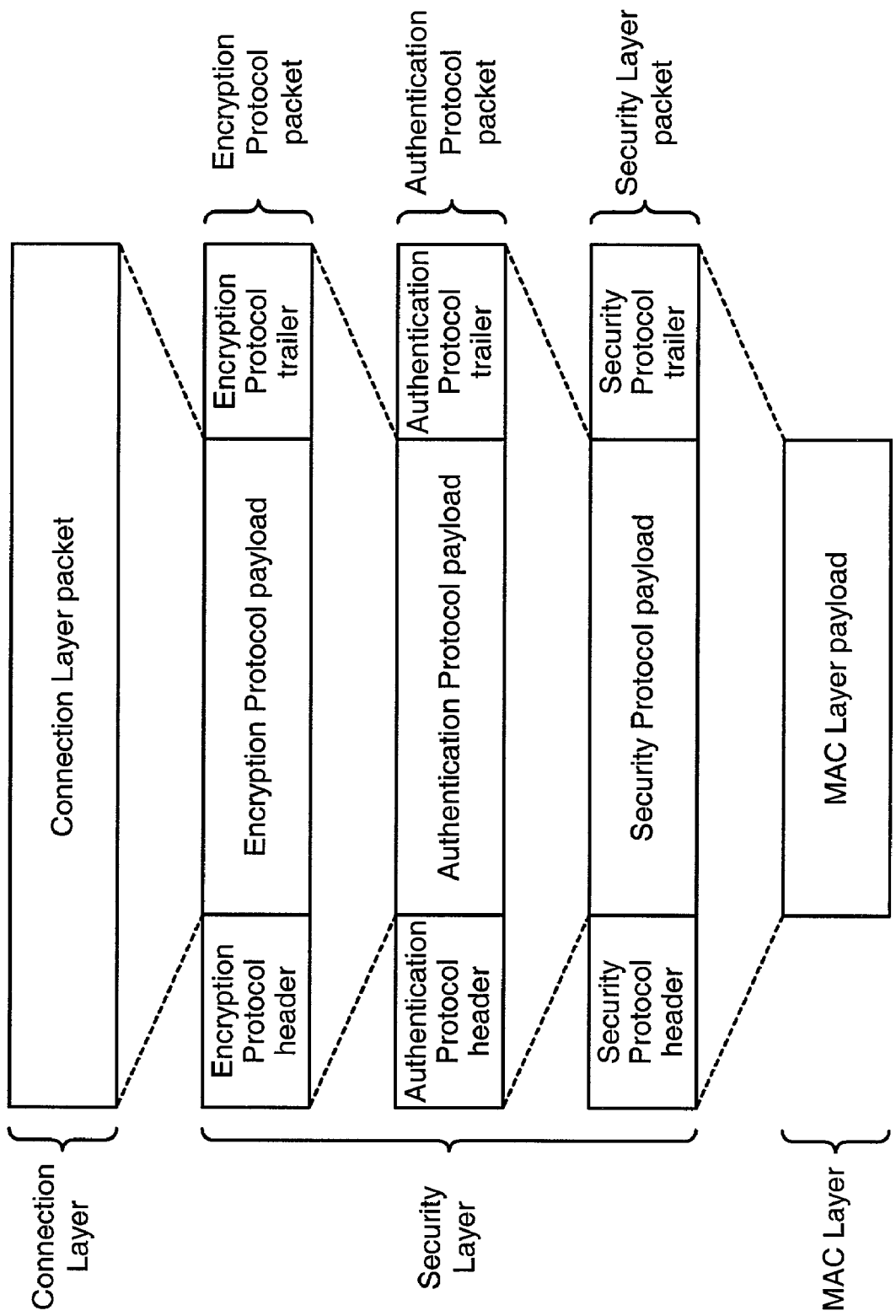
FIG. 4 is a diagram of the encapsulation performed by the Security Layer in accordance with IS-856.

FIG. 4 is a diagram of the encapsulation performed by the Security Layer in accordance with IS-856. At the sender, encryption and authentication are each performed, if at all, on a defined unit of data. For IS-856, this defined unit of data is a Connection Layer packet. Encryption Protocol 214 operates on each Connection Layer packet and provides a corresponding Encryption Protocol packet that includes an Encryption Protocol header, an Encryption Protocol payload, and an Encryption Protocol trailer. Similarly, Authentication Protocol 216 operates on each Encryption Protocol packet and provides a corresponding Authentication Protocol packet that includes an Authentication Protocol header, an Authentication Protocol payload, and an Authentication Protocol trailer. Security Protocol 218 operates on the Authentication Protocol packet and provides a corresponding Security Layer packet that includes a Security Protocol header, a Security Protocol payload, and a Security Protocol trailer. The header and/or trailer for each of these three Protocol packets may not be present (or equivalently, may have a size of zero) if the configured protocol does not require a header and/or a trailer. For example, the header and trailer may not be included in the Security Layer packet if encryption and authentication are not performed by the sender.

As noted above, an important property of the cryptosync is its variability (per encryption attempt), which is characterized by a new cryptosync value being provided each time the security key is used. For IS-856 (as shown in FIG. 4), encryption and/or authentication may be performed on each Connection Layer packet. In this case, a new cryptosync value needs to be generated for each Connection Layer packet to ensure integrity of the security key.

The IS-856 Specification provides a Generic Security Protocol that (1) at the sender, provides a Time Stamp that may be used by the Authentication and Encryption Protocols, and (2) at the receiver, computes the Time Stamp using the information provided in the Generic Security Protocol header or based on the reception time of a packet. The IS-856 Specification also states that when the Security Layer receives a Connection Layer packet that is to be authenticated and/or encrypted, the Generic Security Protocol "shall choose a value for the TimeStampLong based on the current 64-bit representation of CDMA System Time in units of 80 msec" such that certain conditions are met. The 16 least significant bits (LSBs) of the chosen TimeStampLong value is then included in a TimeStampShort field (which is the only field) of the Generic Security Protocol header. The Generic Security Protocol is described in detail in section 7.4 of the IS-856 Specification.

While the Generic Security Protocol specified in IS-856 is sufficient for generating authentication signature on the access channel, the use of the TimeStampShort provided by this Protocol for the cryptosync is inadequate for encryption/authentication on the Forward/Reverse Traffic Channel and the Control Channel for several reasons. First, since the TimeStampLong has a coarse resolution of 80 msec, the TimeStampShort has the same coarse resolution of 80 msec because it is simply the 16-bit least significant portion of the TimeStampLong. A cryptosync derived based solely on the TimeStampShort would have sufficient resolution for low rate channels (e.g., for the signature generation procedure for the Access Channel capsules). However, this cryptosync does not change as fast as is needed for the MAC Layer packets sent on the forward link or reverse link. In particular, the IS-856 Specification supports a maximum rate of 2.4 Mega bits per second (Mbps) on the forward link. Four MAC Layer packets may be generated for every (1.667 msec) slot at this 2.4 Mbps rate, and the corresponding packet rate is four packets per slot. Using TimeStampShort for the cryptosync would mean that the same cryptosync value may be used for up to 192 packets at the 2.4 Mbps rate, which is either undesirable or unacceptable for most applications.

The resolution of the TimeStampLong may be reduced from 80 msec down to the duration of the MAC Layer packet at the maximum rate, which is 0.4167 msec for 2.4 Mbps. This would then allow a new cryptosync value to be provided for each packet. However, the design of various entities (e.g., the base station controller) in the communication system may be impacted by the need to maintain such a (relatively) fine time resolution for the packets. Note that while the base transceiver systems (BTSs) (i.e., the base stations) are required to maintain accurate time (for CDMA systems), the base station controllers (BSCs) do not typically maintains time with a great degree of accuracy.

A cryptosync design is provided herein that may be used for "secured processing" in various wireless communication systems, including IS-856 systems. In a specific design, the cryptosync has a structure that comprises three fields: a channel identifier, an "extended" time stamp, and a counter. The extended time stamp may be obtained by extending a time stamp to the desired length, as described below. In an embodiment, the lengths of the extended time stamp and counter fields and the time unit used for the extended time stamp are configurable parameters. Since ChannelID is not sent over-the-air, no reduction in overhead is gained by making this field shorter. These parameters may be independently configured for each channel that may be used for communication between an access terminal and an access network. For example, the length of the counter field may be specified to be zero ("0") if this field is not needed for a given channel. The fields of the cryptosync and the configurable parameters for these fields are described in further detail below.

In an embodiment, a cryptosync is derived at both the sender and receiver for each packet to be encrypted and/or authenticated. The cryptosync is used at the sender to perform encryption and/or authentication of the packet. The same cryptosync is also used at the receiver for the complementary decryption and/or authentication of the packet.

At the sender, the extended time stamp for the cryptosync may be obtained from the System Time maintained by the sender. The counter value (if any) for the cryptosync may be provided by a counter that is maintained for the channel by the sender. The sender may also include the time stamp and/or the counter value, if they are needed by the receiver to derive the cryptosync, in a header of the packet.

At the receiver, the time stamp and counter value (if any) included in the header of a received packet may be extracted and used to derive the cryptosync. At the receiver, the extended time stamp for the cryptosync may be derived from either (1) the time stamp included in the received packet or (2) the System Time maintained by the receiver. The counter value (if any) for the cryptosync is set to the counter value extracted from the received packet header. The cryptosync design and generation are described in detail below.

The cryptosync described herein may be provided, for example, by a "Time-Counter-Based Security Protocol" (or simply "TCB Security Protocol"). This TCB Security Protocol may be incorporated into the IS-856 Specification or may be published as a separate standard. In any case, the TCB Security Protocol may be selected for use for a communication session via system configuration.

Each communication system typically provides different channels that may be used to transmit different types of data.

For example, IS-856 provides (1) a Forward Traffic Channel (FTC) and a Control Channel (CC) for transmitting user traffic data and signaling, respectively, on the forward link from the access network to the access terminal, and (2) a Reverse Traffic Channel (RTC) and an Access Channel (AC) for transmitting user traffic data and signaling, respectively, on the reverse link from the access terminal to the access network. Since different channels have different characteristics (e.g., different maximum rates), the ability to independently define the parameters of the cryptosync fields allows the cryptosync to be more suitably defined for each channel.

Table 1 lists a set of parameters that are used to define the fields of the cryptosync and the fields of a TCB Security Protocol header in the Security Layer packet (these fields are described in reference to FIG. 5 below).

TABLE 1

| Parameter | Description |
| --- | --- |
| CounterLength | Defines the length of the Counter field |
| TimeStampShortLength | Defines the length of the TimeStampShort field |
| TimestampUnit | Defines the time unit to be used for time-related fields |
| TimeStampLongLength | Defines the length of the extended timestamp |
| KeyIndexLength | Defines the length of the KeyIndex field |

CounterLength is the length of a Counter field in the cryptosync and TCB Security Protocol header. TimeStampShortLength is the length of a TimeStampShort field in the TCB Security Protocol header. TimestampUnit is the time unit to be used for time-related fields in the cryptosync and TCB Security Protocol header. TimeStampLongLength is the length of the extended timestamp. KeyIndexLength is the length of a KeyIndex field in the TCB Security Protocol header. The fields and parameters for the cryptosync and TCB Security Protocol header are described in further detail below.

Figure 5:
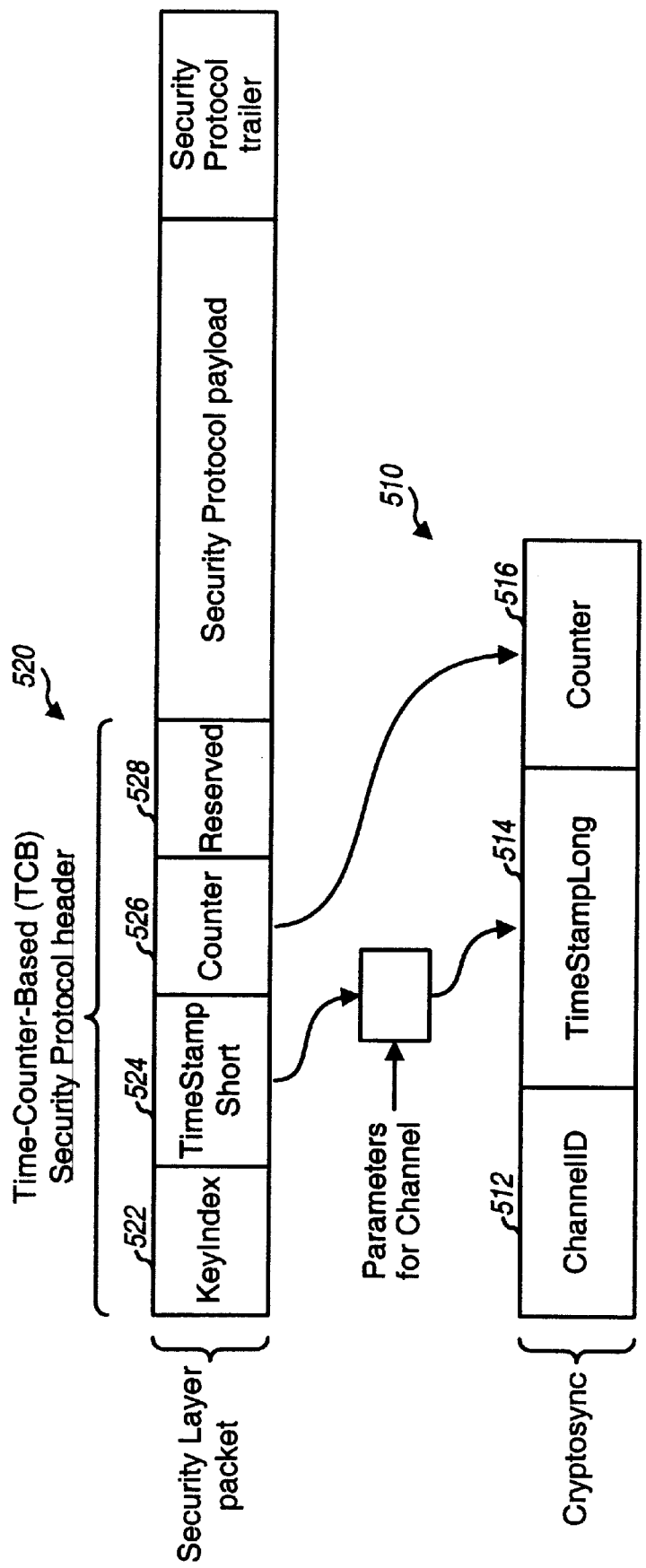
FIG. 5 is a diagram illustrating an embodiment of a cryptosync structure and a Time-Counter-Based Security Protocol header for a Security Layer packet.

FIG. 5 is a diagram illustrating an embodiment of a cryptosync structure 510. In this embodiment, cryptosync structure 510 includes a channel identifier (ChannelID) field 512, a TimeStampLong field 514, and a Counter field 516. Table 2 briefly describes the fields of cryptosync structure 510, each of which is described in further detail below.

TABLE 2

| Field | Description | Length (bits) |
| --- | --- | --- |
| ChannelID | Identifies the specific channel (e.g., FTC, RTC, CC, or AC) for which the cryptosync is used | 8 |
| TimeStampLong | Indicates the time associated with the Security Layer packet | TimeStampLongLength |
| Counter | Provides a count of the number of Security Layer packet within the time unit used for the TimeStampLong | CounterLength |

The ChannelID field ensures that the cryptosyncs for different channels are not equal. Table 3 shows a specific encoding of the ChannelID for the channels defined by IS-856. Other encoding schemes for the ChannelID may also be implemented and are within the scope of the invention.

TABLE 3

| ChannelID Value | Description |
| --- | --- |
| 0x00 | Cryptosync used for the Forward Traffic Channel |
| 0x01 | Cryptosync used for the Reverse Traffic Channel |
| 0x02 | Cryptosync used for the Control Channel |
| 0x03 | Cryptosync used for the Access Channel |
| Other values | Reserved |

The ChannelID values shown in Table 3 (i.e., "0x--") are given in hexadecimal.

The TimeStampLong and Counter fields of the cryptosync, and certain parameters for these fields, may be independently configured for each of the channels identifiable by the ChannelID field. The following description for the TimeStampLong and Counter fields is for a particular channel that is identified by the ChannelID.

In an embodiment, the TimeStampLong field includes a value indicative of the time when the Security Layer packet is constructed. If a Security Layer packet is transmitted with negligible delay after it is constructed (which may be true for the reverse link in IS-856), then the receiver can determine the approximate time the packet was constructed based on the time the packet was received. In this case, the time the packet was constructed need not be included with the packet, which then reduces overhead.

However, if a Security Layer packet is transmitted after having to wait in a scheduling buffer for an unknown period of time (which may be true for the forward link in IS-856), then the receiver cannot determine the time the packet was constructed based on the time the packet was received. In this case, the time the packet was constructed may be included in a TimeStampShort field of the TCB Security Protocol header for the Security Layer packet. At the receiver, the TimeStampShort can be retrieved from the packet header and used to derive the TimeStampLong for the cryptosync.

At the receiver, the TimeStampLong may thus be obtained from either (1) the System Time maintained by the receiver, or (2) the TimeStampShort in the TCB Security Protocol header of the Security Layer packet. If the TimeStampShort is not sent with the Security Layer packet for a given channel (i.e., the TimeStampShortLength for the channel is set to zero), then the TimeStampLong may be set to the least significant bits of the System Time corresponding to the time when the Security Layer packet was received. Otherwise, the TimeStampLong may be derived based on the TimeStampShort in the TCB Security Protocol header, as follows:

$$TimeStampLong = \\ (SystemTime - (SystemTime[(TimeStampShortLength-1):0] - \\ TimeStampShort) \bmod 2^{TimeStampShortLength}) \bmod 2^{TimeStampLongLength}, \quad \text{Eq (1)}$$

where:
SystemTime is the current CDMA System Time in units time specified by TimestampUnit for the channel specified by the ChannelID,
SystemTime[(n-1):0] is the n least significant bits of the SystemTime, and
TimeStampShort is the value in the TimeStampShort field in the TCB Security Protocol header for the channel specified by the ChannelID.

In an embodiment, the time unit used for each channel may be specified by the TimestampUnit for that channel. The TimestampUnit is configurable for each channel. This then allows different time units to be used for different channels that may be capable of supporting different packet rates. The TimeStampLong, TimeStampShort, and SystemTime for each channel are all given in units of time specified by the TimestampUnit for that channel.

In equation (1), the quantity (SystemTime[(TimeStampShortLength-1):0]−TimeStampShort) is indicative of the amount of time between the current System Time and the TimeStampShort in the TCB Security Protocol header, which is indicative of the time when the Security Layer packet was constructed. Since the TimeStampShort is sent using only TimeStampShortLength least significant bits, the quantity (SystemTime[(TimeStampShortLength-1):0]−TimeStampShort) may be a negative value, which occurs whenever SystemTime[(TimeStampShortLength-1):0] value wraps around. The mod $2^{TimeStampShortLength}$ operation then provides a positive value that accurately reflects the difference between the time of construction at the sender and the time of receipt at the receiver. The quantity (SystemTime[(TimeStampShortLength-1):0]−TimeStampShort) mod $2^{TimeStampShortLength}$) is a non-negative value of length TimeStampShortLength bits.

The values of the TimeStampLong computed in equation (1) is indicative of the representation of the system time in units of TimestampUnit that was used by the sender as part of the cryptosync. As shown in Table 2, the ChannelID field has a length of 8 bits and the Counter field has a length of CounterLength bits. The overall length of the cryptosync is then TimeStampLongLength+CounterLength+8 bits (8 bits is the length of the ChannelID).

In an embodiment, the Counter field of the cryptosync may be configured to include a count of the number of Security Layer packets constructed within the time unit used for the TimeStampShort and TimeStampLong for the channel. In particular, if multiple packets may be sent on the channel within one TimestampUnit, then a corresponding Counter field may be included in the TCB Security Protocol header and used to provide this packet count. The packet count for each channel may be maintained with a respective counter at the sender. The length of the Counter field in both the cryptosync and TCB Security Protocol header may be configured via the CounterLength parameter for the channel. If the Counter field is not needed (e.g., if only one Security Layer packet may be sent within one TimestampUnit over the channel), then this field in the cryptosync and TCB Security Protocol header may be omitted by setting the CounterLength to zero.

The combination of the TimeStampLong and Counter provides a unique cryptosync for each Security Layer packet sent on the channel identified by the ChannelID. This cryptosync may be effectively partitioned into a coarse portion and a fine portion. The coarse portion corresponds to the TimeStampLong, which is given in units of TimestampUnit. At the sender, the coarse portion may be derived based on the System Time maintained by the sender. At the receiver, the coarse portion may be derived based on the TimeStampShort that is included in the Security Layer packet or the System Time maintained by the receiver.

The fine portion corresponds to the Counter, which is indicative of the number of Security Layer packets sent in the time interval specified by one TimestampUnit. At the sender, this packet count may be obtained based on a counter that may be incremented each time a new Security Layer packet is constructed. At the receiver, this packet count may be obtained based on the Counter that is included in the Security Layer packet. Without this fine portion, the TimeStampShort is required to have a resolution of at least one-quarter of a slot, since there can be up to four Security Layer packets per slot for the 2.4 Mbps rate on the Forward Traffic Channel. This may not be a reasonable requirement to be imposed on the accuracy of the time maintained for the packets by the base station controller (BSC).

To reduce overhead, the TimeStampShort may be sent on the Security Layer packet with the minimum number of bits (as specified by the TimeStampShortLength) needed to avoid ambiguity in generating the cryptosync at the receiver. In particular, the TimeStampShortLength is selected to provide a time-span that is longer than the longest possible delay in transmitting the packet, where time-span=$2^{TimeStampShortLength}$×TimestampUnit. To also reduce overhead, the Counter field is only included in the Security Layer packet if it is needed, and the length of the Counter field may also be specified with the minimum number of bits (as specified by the CounterLength) needed to avoid ambiguity in generating the cryptosync at the receiver.

The combination of the TimeStampShort and Counter also advantageously provides an automatic self-synchronizing mechanism for the cryptosync. In an embodiment, the counter maintained at the sender for the Counter field may be reset whenever the TimeStampShort changes (i.e., is incremented). By resetting the Counter based on the TimeStampShort, the Counter is self-synchronizing. If the TimeStampShort is not sent in the packet header, then a procedure for detecting lack of synchronization would be needed (e.g., to detect that the MSBs of the extended Counter are not equal at the access terminal and access network), and a procedure to re-synchronize the extended Counters would also be needed. These additional procedures may complicate a cryptosync design based solely on a counter.

FIG. 5 also shows an embodiment of an TCB Security Protocol header 520 for a Security Layer packet. In this embodiment, TCB Security Protocol header 520 includes a KeyIndex field 522, a TimeStampShort field 524, a Counter field 526, and a Reserved field 528. Table 4 summaries the fields of TCB Security Protocol header 520, each of which is described in further detail below.

TABLE 4

| Field | Length (bits) |
| --- | --- |
| KeyIndex | KeyIndexLength |
| TimeStampShort | TimeStampShortLength |
| Counter | CounterLength |
| Reserved | 0 to 7 (as needed) |

The KeyIndex field is used to determine whether or not the access terminal and access network are both using the same set of security keys. The sender increments the KeyIndex by one and further performs a (modulo $2^{KeyIndexLength}$) operation on the incremented value each time it negotiates a new set of security keys with the receiver. KeyIndexLength is the length of the KeyIndex field and is a configurable parameter that may be defined for the channel on which the Security Layer packet is to be sent.

The TimeStampShort field is used to provide the TimeStampShortLength least significant bits of the System Time when the Security Layer packet is constructed. The TimeStampShort is given in the time unit defined for the channel on which the Security Layer packet is to be sent. This time unit is TimestampUnit, which is a configurable parameter that may also be defined for the channel.

The Counter field is used to provide a count of the number of Security Layer packets constructed within the one TimestampUnit. The sender resets the Counter to zero ("0") each time the TimeStampShort changes. The sender increments the Counter by one and further performs a (modulo $2^{Counter\_Length}$) operation on the incremented value each time a new Security Layer packet is constructed. CounterLength is the length of the Counter field and is a configurable parameter that may be defined for the channel on which the Security Layer packet is to be sent.

The Reserved field is used to pad the TCB Security Protocol header such that it is octet aligned. If included, the sender sets this field to a value of zero ("0"). The length of this field is selected to be the smallest number of bits that results in the TCB Security Protocol header comprising an integer number of octets.

In an embodiment, the lengths of the fields in the TCB Security Protocol header are configurable via their respective length parameters. This design allows the lengths of these fields to be specified and changed as needed (e.g., if the maximum rate on a given channel is increased). The configurable field lengths allow the TCB Security Protocol to be forward compatible with future revisions of the IS-856 standard.

FIG. 5 also shows the relationship between the fields of the cryptosync and the fields of the TCB Security Protocol header. The value in TimeStampShort field 524 of the TCB Security Protocol header (if it is included in the packet) may be used along with other parameters for the channel (e.g., TimeStampLongLength) and the System Time to derive the value for TimeStampLong field 514 of the cryptosync. The value in Counter field 526 (if it is included in the header) may be directly provided as the value for Counter field 516 of the cryptosync.

During session establishment or system configuration, the values for various parameters (such as those related to the cryptosync) may be negotiated between the access network and access terminal. A "complex" attribute covers a set of parameters that are typically negotiated together, such as those listed in Table 1. As part of the negotiation, the sender may propose one or more possible sets of values to be used for a particular set of parameters. Each set of parameter values may be provided in a respective record of a message for the complex attribute. The message for the configuration of a complex attribute may thus include one or more records for one or more sets of parameter values.

The complex attribute associated with the TCB Security Protocol for each channel is described below. Each complex attribute covers the parameters for the fields of the cryptosync and TCB Security Protocol header for the associated channel.

Forward Traffic Channel

Table 5 shows the configurable parameters for the Forward Traffic Channel. In IS-856, these parameters may be configured via the Session Configuration Protocol.

TABLE 5

| Field | Length (bits) | Default Value (decimal) |
|---|---|---|
| Length | 8 | N/A |
| AttributeID | 8 | N/A |
| One or more of the following record: | | |
| ValueID | 8 | N/A |
| FTCKeyIndexLength | 8 | 0 |
| FTCTimeStampShortLength | 8 | 8 |
| FTCTimeStampLongLength | 8 | 48 |
| FTCTimestampUnit | 16 | 64 |
| FTCCounterLength | 8 | 8 |

The Length field is indicative of the length of the complex attribute shown in Table 5 and is given in units of octets. The sender sets this field to the length of the complex attribute excluding the Length field itself. The AttributeID field is set to 0x00 by the sender for the Forward Traffic Channel. The ValueID field identifies this particular set of values for the complex attribute. The sender increments this field for each record of parameters included in the complex attribute.

The FTCKeyIndexLength field is set by the sender to the KeyIndexLength defined for the Forward Traffic Channel. This KeyIndexLength specifies the length of the KeyIndex field (in bits) in the TCB Security Protocol header for the Security Layer packets to be sent on the Forward Traffic Channel.

The FTCTimeStampShortLength field is set by the sender to the TimeStampShortLength defined for the Forward Traffic Channel. This TimeStampShortLength specifies the length of the TimeStampShort field (in bits) in the TCB Security Protocol header for the Security Layer packets to be sent on the Forward Traffic Channel.

The FTCTimeStampLongLength field is set by the sender to the TimeStampLongLength defined for the Forward Traffic Channel, which specifies the length of the TimeStampLong field (in bits) in the cryptosync used for the Security Layer packets to be sent on the Forward Traffic Channel.

The FTCTimestampUnit field is set by the sender to the TimestampUnit defined for the Forward Traffic Channel. This TimestampUnit specifies the unit of the TimeStampShort field (in slots) in the TCB Security Protocol header for the Security Layer packets to be sent on the Forward Traffic Channel.

The FTCCounterLength field is set by the sender to the CounterLength defined for the Forward Traffic Channel. This CounterLength specifies the length of the Counter field (in bits) in the TCB Security Protocol header for the Security Layer packets to be sent on the Forward Traffic Channel.

Table 6 shows various possible values for TimestampUnit, CounterLength, and TimeStampShortLength for the Forward Traffic Channel and the corresponding TimeStampShort time-span and cryptosync length. These parameter values are for a maximum rate of 2.4 Mbps for the Forward Traffic Channel, which corresponds to four Security Layer packets per 1.667 msec slot. The default values for CounterLength and TimeStampShortLength are shown in the gray column.

TABLE 6

| Parameters | Parameter Values | | | | | | |
|---|---|---|---|---|---|---|---|
| TimestampUnit (msec) | 0.42 | 20 | 40 | 60 | 80 | 106.7 | 1000 |
| TimestampUnit (slots) | 1/4 | 12 | 24 | 36 | 48 | 64 | 600 |
| Max number of packets/TimestampUnit | 1 | 48 | 96 | 144 | 192 | 256 | 2400 |
| CounterLength (bits) | 0 | 6 | 7 | 8 | 8 | 8 | 12 |
| TimeStampShortLength (bits) | 16 | 10 | 9 | 9 | 8 | 8 | 4 |
| TimeStampShort time-span (sec) | 27.3 | 20.5 | 20.5 | 30.7 | 20.5 | 27.3 | 16 |
| Cryptosync length (octets) | 2 | 2 | 2 | 3 | 2 | 4 | 2 |

The time-span for the TimeStampShort represents the maximum amount of time that a given Security Layer packet can wait in the scheduling buffer prior to transmission to avoid ambiguity in the generation of the cryptosync at the receiver based on the TimeStampShort included in the TCB Security Protocol header.

Reverse Traffic Channel

Table 7 shows the configurable parameters for the Reverse Traffic Channel.

TABLE 7

| Field | Length (bits) | Default Value (decimal) |
|---|---|---|
| Length | 8 | N/A |
| AttributeID | 8 | N/A |
| One or more of the following record: | | |
| ValueID | 8 | N/A |
| RTCKeyIndexLength | 8 | 0 |
| RTCTimeStampShortLength | 8 | 0 |
| RTCTimeStampLongLength | 8 | 56 |
| RTCTimestampUnit | 16 | 16 |
| RTCCounterLength | 8 | 0 |

The Length, AttributeID, and ValueID fields are as described above for the Forward Traffic Channel, except that the AttributeID field is set to 0x01 by the sender for the Reverse Traffic Channel.

The RTCKeyIndexLength field is set by the sender to the KeyIndexLength defined for the Reverse Traffic Channel. This KeyIndexLength specifies the length of the KeyIndex field (in bits) in the TCB Security Protocol header for the Security Layer packets to be sent on the Reverse Traffic Channel.

The RTCTimeStampShortLength field is set by the sender to the TimeStampShortLength defined for the Reverse Traffic Channel. This TimeStampShortLength specifies the length of the TimeStampShort field (in bits) in the TCB Security Protocol header for the Security Layer packets to be sent on the Reverse Traffic Channel.

The RTCTimeStampLongLength field is set by the sender to the TimeStampLongLength defined for the Reverse Traffic Channel, which specifies the length of the TimeStampLong field (in bits) in the cryptosync used for the Security Layer packets to be sent on the Reverse Traffic Channel.

The RTCTimestampUnit field is set by the sender to the TimestampUnit defined for the Reverse Traffic Channel. This TimestampUnit specifies the unit of the TimeStampShort field (in slots) in the TCB Security Protocol header for the Security Layer packets to be sent on the Reverse Traffic Channel.

The RTCCounterLength field is set by the sender to the CounterLength defined for the Reverse Traffic Channel. This CounterLength specifies the length of the Counter field (in bits) in the TCB Security Protocol header for the Security Layer packets to be sent on the Reverse Traffic Channel.

As shown in Table 7, the default values for the lengths (i.e., CounterLength, TimeStampShortLength, and KeyIndexLength) of all fields in the TCB Security Protocol header for the Reverse Traffic Channel are zeros. Thus, the default TCB Security Protocol header for the Reverse Traffic Channel is null (i.e., no bits). This is possible for the Reverse Traffic Channel because, unlike the forward link Security Layer packets that may wait in a scheduling buffer, the access terminal knows the System Time at which a Security Layer packet is sent over the air and the access network can timestamp the Security Layer packet upon reception. In contrast, because of the uncertainty introduced by the scheduling buffer for forward link Security Layer packets, the TimeStampShort is included in each packet to allow the receiver to properly generate the cryptosync.

Control Channel

Table 8 shows the configurable parameters for the Control Channel.

TABLE 8

| Field | Length (bits) | Default Value (decimal) |
|---|---|---|
| Length | 8 | N/A |
| AttributeID | 8 | N/A |
| One or more of the following record: | | |
| ValueID | 8 | N/A |
| CCKeyIndexLength | 8 | 2 |
| CCTimeStampShortLength | 8 | 12 |
| CCTimeStampLongLength | 8 | 54 |
| CCTimestampUnit | 16 | 64 |
| CCCounterLength | 8 | 2 |

The Length AttributeID, and ValueID fields are as described above for the Forward Traffic Channel, except that the AttributeID field is set to 0x02 by the sender for the Control Channel.

The CCKeyIndexLength field is set by the sender to the KeyIndexLength defined for the Control Channel. This KeyIndexLength specifies the length of the KeyIndex field (in bits) in the TCB Security Protocol header for the Security Layer packets to be sent on the Control Channel.

The CCTimeStampShortLength field is set by the sender to the TimeStampShortLength defined for the Control Channel. This TimeStampShortLength specifies the length of the TimeStampShort field (in bits) in the TCB Security Protocol header for the Security Layer packets to be sent on the Control Channel.

The CCTimeStampLongLength field is set by the sender to the TimeStampLongLength defined for the Control Channel, which specifies the length of the TimeStampLong field (in bits) in the cryptosync used for the Security Layer packets to be sent on the Control Channel.

The CCTimestampUnit field is set by the sender to the TimestampUnit defined for the Control Channel. This TimestampUnit specifies the unit of the TimeStampShort field (in slots) in the TCB Security Protocol header for the Security Layer packets to be sent on the Control Channel.

The CCCounterLength field is set by the sender to the CounterLength defined for the Control Channel. This CounterLength specifies the length of the Counter field (in bits) in the TCB Security Protocol header for the Security Layer packets to be sent on the Control Channel.

Table 9 shows various possible values for TimestampUnit, CounterLength, and TimeStampShortLength for the Control Channel and the corresponding TimeStampShort time-span and cryptosync length. These parameter values are for a maximum rate of 38.4 Kbps for the Control Channel, which corresponds to one Security Layer packet per 26.67 msec frame. The default values for CounterLength and TimeStampShortLength are shown in the gray column.

TABLE 9

| Parameters | Parameter Values | | | | | | |
|---|---|---|---|---|---|---|---|
| TimestampUnit (msec) | 80 | 100 | 106.7 | 160 | 320 | 640 | 1000 |
| TimestampUnit (slots) | 48 | 60 | 64 | 96 | 192 | 384 | 600 |
| Max number of packets/ TimestampUnit | 3 | 3.75 | 4 | 6 | 12 | 24 | 37.5 |
| CounterLength (bits) | 2 | 2 | 2 | 3 | 4 | 5 | 6 |
| TimeStampShortLength (bits) | 12 | 12 | 12 | 11 | 10 | 9 | 9 |
| TimeStampShort time-span (sec) | 327.7 | 409.6 | 436.9 | 327.7 | 327.7 | 327.7 | 512 |
| Cryptosync length (octets) | 2 | 2 | 2 | 2 | 2 | 2 | 3 |

Access Channel

Table 10 shows the configurable parameters for the Access Channel.

TABLE 10

| Field | Length (bits) | Default Value (decimal) |
|---|---|---|
| Length | 8 | N/A |
| AttributeID | 8 | N/A |
| One or more of the following record: | | |
| ValueID | 8 | N/A |
| ACKeyIndexLength | 8 | 2 |
| ACTimeStampShortLength | 8 | 10 |
| ACTimeStampLongLength | 8 | 52 |
| ACTimestampUnit | 16 | 64 |
| ACCounterLength | 8 | 4 |

The Length AttributeID, and ValueID fields are as described above for the Forward Traffic Channel, except that the AttributeID field is set to 0x03 by the sender for the Access Channel.

The ACKeyIndexLength field is set by the sender to the KeyIndexLength defined for the Access Channel. This KeyIndexLength specifies the length of the KeyIndex field (in bits) in the TCB Security Protocol header for the Security Layer packets to be sent on the Access Channel.

The ACTimeStampShortLength field is set by the sender to the TimeStampShortLength defined for the Access Channel. This TimeStampShortLength specifies the length of the TimeStampShort field (in bits) in the TCB Security Protocol header for the Security Layer packets to be sent on the Access Channel.

The ACTimeStampLongLength field is set by the sender to the TimeStampLongLength defined for the Access Channel, which specifies the length of the TimeStampLong field (in bits) in the cryptosync used for the Security Layer packets to be sent on the Access Channel.

The ACTimestampUnit field is set by the sender to the TimestampUnit defined for the Access Channel. This TimestampUnit specifies the unit of the TimeStampShort field (in slots) in the TCB Security Protocol header for the Security Layer packets to be sent on the Access Channel.

The ACCounterLength field is set by the sender to the CounterLength defined for the Access Channel. This CounterLength specifies the length of the Counter field (in bits) in the TCB Security Protocol header for the Security Layer packets to be sent on the Access Channel.

Table 11 shows various possible values for TimestampUnit, CounterLength, and TimeStampShortLength for the Access Channel and the corresponding TimeStampShort time-span and cryptosync length. These parameter values are for a maximum rate of 153.6 Kbps for the Access Channel (i.e., one Security Layer packet every four slots). The default values for CounterLength and TimeStampShortLength are shown in the gray column.

TABLE 11

| Parameters | Parameter Values | | | | | | |
|---|---|---|---|---|---|---|---|
| TimestampUnit (msec) | 80 | 100 | 106.7 | 160 | 320 | 640 | 1000 |
| TimestampUnit (slots) | 48 | 60 | 64 | 96 | 192 | 384 | 600 |
| Max number of packets/ TimestampUnit | 12 | 15 | 16 | 24 | 48 | 96 | 150 |
| CounterLength (bits) | 4 | 4 | 4 | 5 | 6 | 7 | 8 |
| TimeStampShortLength (bits) | 10 | 10 | 10 | 9 | 8 | 7 | 7 |
| TimeStampShort time-span (sec) | 81.9 | 102.4 | 109.2 | 81.9 | 81.9 | 81.9 | 128 |
| Cryptosync length (octets) | 2 | 2 | 2 | 2 | 2 | 2 | 3 |

Tables 5, 7, 8, and 10 show specific default values for the parameters of the Forward Traffic Channel, Reverse Traffic Channel, Control Channel, and Access Channel, respectively. Other default values may also be selected for these parameters, and this is within the scope of the invention.

Cryptosync Design Considerations

As shown in Tables 5 through 11, for each channel, the parameters for the cryptosync and TCB Security Protocol header are associated with default values defined for that channel. The default values for each channel may be different from those of the other channels due to the different characteristics of these channels.

The default values for each channel are defined such that they are consistent with the IS-856 Physical Layer. If some of the physical characteristics of these channels change in a future revision of the IS-856 standard (e.g., the maximum rate supported by the Forward Traffic Channel increases), then the access network and the access terminal may negotiate a different set of values for the parameters. The following are some of the guidelines that should be observed in selecting values for these parameters.

- The length of the Counter field in the TCB Security Protocol header (CounterLength) should be selected such that the value for this field does not wrap-around in the time interval specified by the TimestampUnit.
- The time-span specified by the TimeStampShortLength and TimestampUnit (i.e., time-span=$2^{TimeStampShortLength}$×TimestampUnit) and proposed by the access network should be greater than or equal to the time-span proposed by the access terminal (if any). This ensures that the access network does not require the System Time to be maintained with more accuracy than the access terminal can support.
- The access network should not propose a CounterLength that is smaller than one proposed by the access terminal (if any). This ensures that the Counter does not wrap-around in the time interval specified by the TimestampUnit.
- The TimeStampShort is used to convey the time instant when a Security Layer packet was constructed. The TimeStampShort is specified to cover the proper time-span (by selecting the proper values for TimeStampShortLength and TimestampUnit) to avoid ambiguity in deriving the TimeStampLong at the receiver. The Security Layer packets may not be transmitted immediately after construction. If an 8-bit TimeStampShort is specified and the time unit is 64 slots, then the TimeStampShort spans a 27.3 seconds time interval. In this case, if a Security Layer packet stays in the scheduling buffer for less than approximately 27 seconds prior to transmission, then the 8 least significant bits of the System Time and the 8-bit TimeStampShort do not roll over while the packet is waiting to be transmitted, and the receiver can derive the TimeStampLong unambiguously.

The cryptosync design described herein using both a time value and a counter value allows the base station controller (BSC) to maintain less accurate System Time than that maintained by the base transceiver system (BTS). Let $T_{lead}$ and $T_{lag}$ denote the maximum duration of time that the base station controller may lead or lag GPS time, respectively. Also, let $T_{wait}$ denote the maximum amount of time that a Security Layer packet is expected to wait in the scheduling buffer. Then, the only requirement on $T_{lead}$ and $T_{lag}$ is that $T_{lead}+T_{lag}+T_{wait}$ is less than the time-span of 27.3 seconds.

The fields of the TCB Security Protocol header may be specified to reduce overhead while providing the required information to properly construct the cryptosync at the receiver. The TCB Security Protocol header is added to a Connection Layer packet to form a Security Layer packet, which is then used to form a MAC Layer packet payload. The default length of the TCB Security Protocol header is 16 bits for the Forward Traffic Channel, Control Channel, and Access Channel, and 0 bit for the Reverse Traffic Channel. The length of the MAC Layer packet is 1002 bits. The overhead is thus 1.6% for the Forward Traffic Channel, 0% for the Reverse Traffic Channel, 1.6% for the Control Channel, and 16 bits per Access Channel MAC Layer capsule.

To prevent compromise of security, protection against re-play of Security Layer packets sent on the Access Channel by a rogue access terminal should be provided. This is because a rogue terminal may re-play a signed Security Layer packet from a legitimate terminal in order to gain access to the traffic channel. Since the Security Layer packets on the Access Channel are sent in a stop-and-wait fashion, the access network should discard a Security Layer packet whose TCB Security Layer header includes a Counter value that is not greater than the Counter value in the last received Security Layer packet that is associated with the same TimeStampShort.

Protecting against re-play of Security Layer packets sent on the Forward Traffic Channel is not necessary for several reasons. First, the Radio Link Protocol (RLP) at the receiver drops duplicate RLP packets, so the re-played RLP packet does not do any harm. Second, other than denial of service attack (which the Security Layer is not specified to protect against), re-play of signaling messages on the Forward Traffic Channel does not seem to cause any harm. Third, packets sent on the forward link may wait some time in the scheduling buffer before transmission, and Security Layer packets may be transmitted out-of-order. For example, a Security Layer packet that contains signaling has higher priority and may be transmitted earlier than Security Layer packets that were constructed before it. Therefore, the receiver cannot implement a "windowed" anti-replay scheme. Such a window would limit the amount of time that a packet is allowed to wait in the scheduling buffer.

A rogue terminal may attempt to re-play a Security Layer packet sent on the Access Channel after t seconds, where t is the amount of time that it takes for the TimeStampShort to rollover (i.e., t is equal to the time-span of the TimeStampShort). This attack cannot be successful because the TimeStampLong (and therefore the cryptosync) will be different after t seconds and the authentication signature and encryption will fail (i.e., the access network will drop the re-played packet).

Access Terminal and Access Point

Figure 6:
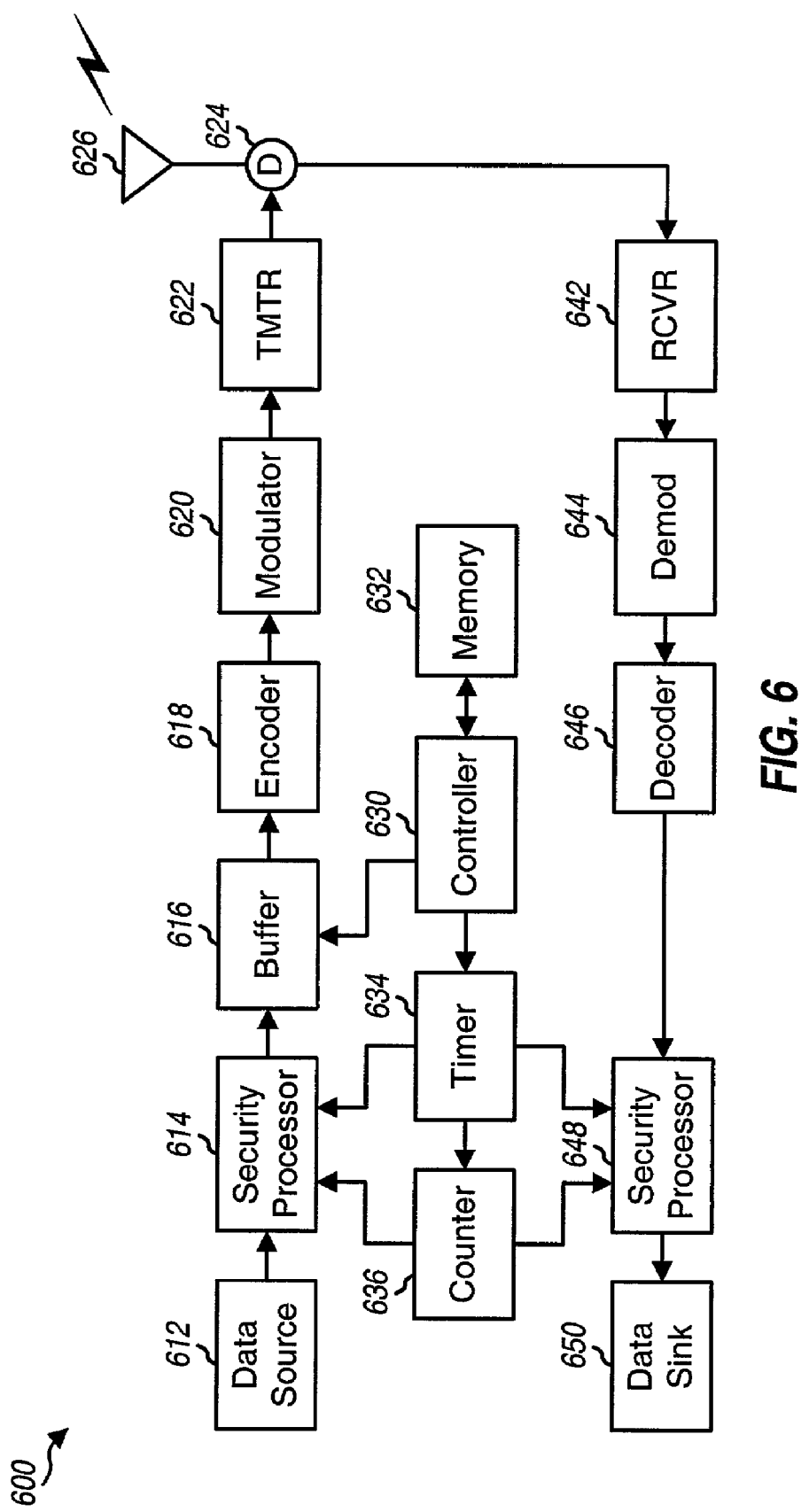
FIG. 6 is a block diagram of an embodiment of an access point in a radio network.

FIG. 6 is a block diagram of an embodiment of an access point 600 in a radio network. Access point 600 transmits traffic data and signaling (collectively referred to as "data") on the forward link to the access terminals within its coverage area and receives data on the reverse link from the access terminals. Within access point 600, on the forward link, data from a data source 612 is provided to a security processor 614. If secured processing is to be performed, for each Connection Layer packet, security processor 614 derives a cryptosync based on the System Time provided by a timer 634 and possibly a counter value provided by a counter 636. Security processor 614 then performs the secured processing (which may include encryption and/or authentication) on the Connection Layer packet using the cryptosync and a security key to provide a corresponding Security Layer packet. The Security Layer packet, which includes an TCB Security Protocol header as shown in FIG. 5, is stored to a buffer 616.

As each Security Layer packet in buffer 616 is ready for transmission, as determined by a controller 630, the packet is retrieved from the buffer and provided to an encoder 618. Encoder 618 then encodes the data for each packet in accordance with a particular encoding scheme selected for the channel on which the packet is to be transmitted. The selected encoding scheme may include CRC, convolutional coding, Turbo coding, some other coding, or any combination thereof. A modulator 620 then modulates the encoded data in accordance with a particular modulation scheme, which may include, for example, covering, spreading, and so on. A transmitter (TMTR) 622 then converts the modulated data into one or more analog signals and further conditions (e.g., filters, amplifies, and upconverts) the analog signals to provide a forward link modulated signal, which is routed via a duplexer (D) 624 and transmitted from an antenna 626 to the access terminal(s).

Figure 7:
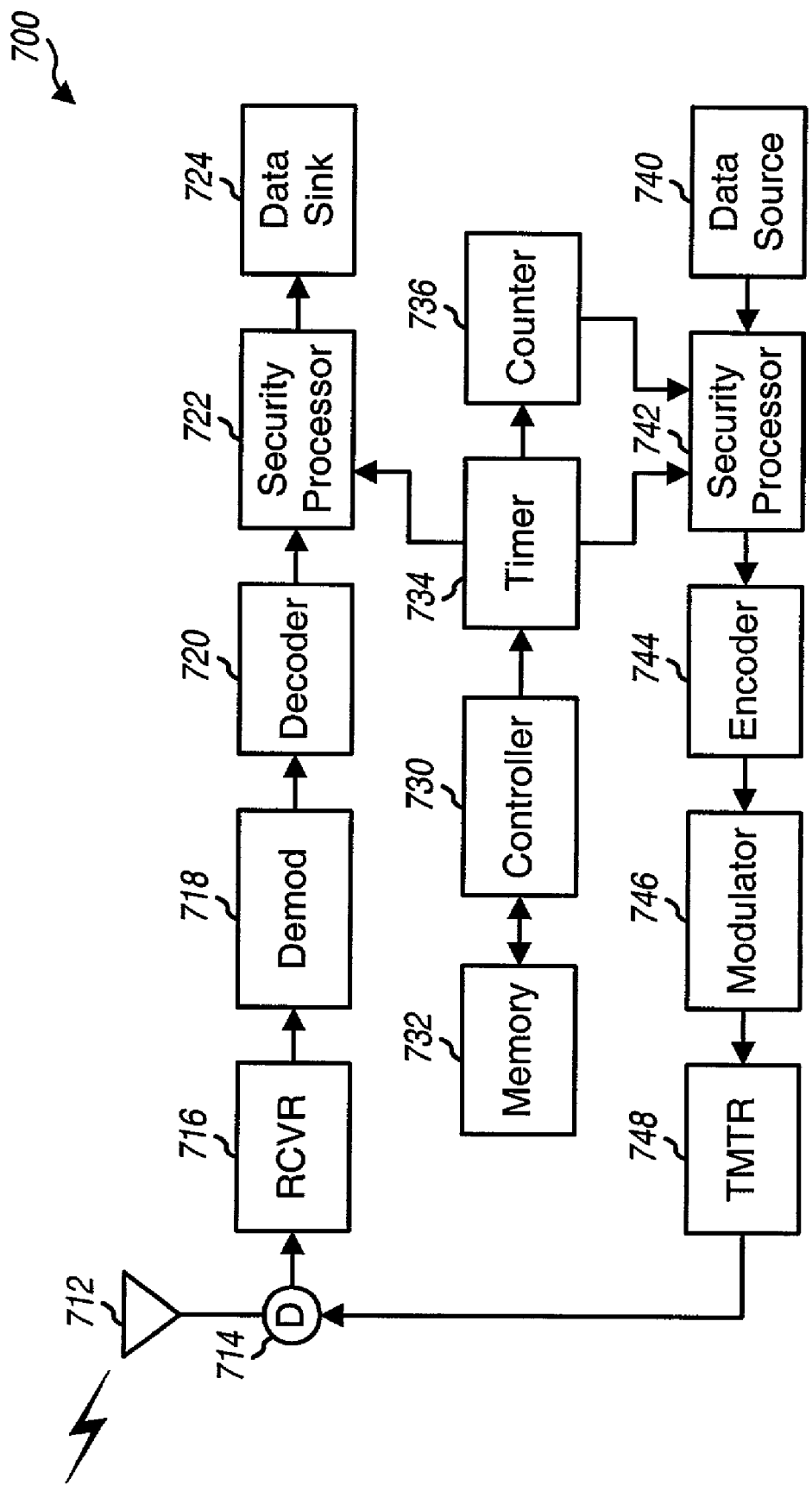
FIG. 7 is a block diagram of an embodiment of an access terminal.

FIG. 7 is a block diagram of an embodiment of an access terminal 700. At access terminal 700, the forward link modulated signal is received by an antenna 712, routed through a duplexer (D) 714, and provided to a receiver (RCVR) 716. Receiver 716 conditions (e.g., amplifies, filters, and downconverts) the received signal and digitizes the conditioned signal to provide samples. A demodulator (Demod) 718 then demodulates the samples in accordance with a demodulation scheme that is complementary to the modulation scheme used at access point 600. A decoder 720 next decodes the demodulated data in accordance with a decoding scheme that is complementary to the encoding scheme used at access point 600.

A security processor 722 then performs the complementary secured processing on the decoded data, if configured to do so. For each received Security Layer packet, security processor 722 derives a cryptosync based on (1) the channel ID (either the Forward Traffic Channel or Control Channel for the forward link), (2) the values in the TimeStampShort and Counter fields of the TCB Security Protocol header for the packet, (3) the parameters for the channel, and (4) the System Time from a timer 734. Security processor 722 then performs the authentication and/or decryption (if configured) on the Security Layer payload using the cryptosync and a security key to provide a corresponding Connection Layer packet, which is then provided to a data sink 724.

The data transmission on the reverse link proceeds in similar manner. At access terminal 700, data is provided from a data source 740 to a security processor 742. If secured processing is to be performed, for each Connection Layer packet, security processor 742 derives a cryptosync based on the System Time from timer 734 and possibly a counter value from a counter 736, performs encryption and/or authentication on the packet, and provides a corresponding Security Layer packet. For the Reverse Traffic Channel, the TimeStampShort and Counter fields are not included in the packet (by default), and the TCB Security Protocol header is null. The data for the Security Layer packet is then encoded by an encoder 744 in accordance with a particular encoding scheme, and further modulated by a modulator 746 in accordance with a particular modulation scheme. A transmitter 748 then converts the modulated data into one or more analog signals and conditions the analog signals to provide a reverse link modulated signal, which is routed via duplexer 714 and transmitted from antenna 716 to the access point.

Referring back to FIG. 6, at access terminal 700, the reverse link modulated signal is received by antenna 626, routed through duplexer 624, and provided to a receiver 642. Receiver 642 conditions and digitizes the received signal to provide samples, which are further demodulated by demodulator 644 and then decoded by a decoder 646. A security processor 648 then performs the complementary secured processing (e.g., authentication and/or decryption) on the decoded data, if so configured. For each received Security Layer packet, security processor 648 derives a cryptosync based on either (1) the values in the TimeStampShort and Counter fields (if any) in the TCB Security Protocol header of the packet, or (2) the System Time from timer 634 and a counter value from counter 636. Security processor 648 then performs the authentication and/or decryption on the Security Layer payload using the cryptosync to provide a corresponding Connection Layer packet, which is then provided to a data sink 650.

In FIGS. 6 and 7, controllers 630 and 730 direct the operation at the access point and access terminal, respectively. Memories 632 and 732 provide storage for program codes and data used by controllers 630 and 730, respectively. Timers 634 and 734 maintain track of System Time at the access point and access terminal, respectively. The System Time is typically based on GPS time. Timer 734 at the access terminal may be synchronized to timer 634 at the access point using techniques known in the art. Counters 636 and 736 provide the necessary packet count for the access point and access terminal, respectively. Each of counters 636 and 736 includes a sufficient number of individual counters, one for each channel that needs counter values for the packets to be transmitted on that channel.

For clarity, a specific cryptosync design having three fields has been described. Variations and modifications to this specific cryptosync design may be made, and this is within the scope of the invention. For example, the ChannelID field may be omitted or incorporated into one of the other two fields. Alternative and/or different fields may also be included in the cryptosync, and this is also within the scope of the invention.

Also for clarity, various aspects of the cryptosync design have been specifically described for an IS-856 system. However, the cryptosync design described herein may also be used for other CDMA systems, such as cdma2000 and W-CDMA systems, and for other wireless communication systems.

Techniques for generating and using the cryptosync described herein may be implemented by various means. For example, these techniques may be implemented in hardware, software, or a combination thereof. For a hardware implementation, the cryptosync generation and use may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the cryptosync generation and use may be implemented with modules (e.g., procedures, functions, and so on) that perform the functions described herein. The software codes may be stored in a memory unit (e.g., memories 632 and 732 in FIGS. 6 and 7, respectively) and executed by a processor (e.g., controllers 630 and 730 in FIGS. 6 and 7, respectively). The memory unit may comprise a non-transitory computer-usable storage medium for storing code for causing a computer to perform the functions. The memory unit may be implemented within the processor or external to the processor, in which case it can be communicatively coupled to the processor via various means as is known in the art.

The cryptosync and data packets described herein may be derived/constructed and stored in various types of electronics unit. For example, the cryptosync and data packets may be stored in a random access memory (RAM), a dynamic RAM (DRAM), a Flash, and so on. The cryptosync and data packets may also be stored in temporary memory, registers, latches, and so on, within the ASIC, processor, DSP, and so on, that may be used to perform secured processing on the data packets with the cryptosync.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An electronics unit that stores a cryptosync used for secured processing of a data packet for communication on a particular channel in a wireless communication system having a plurality of channels, the cryptosync comprising:
    a first field for an extended time stamp associated with the data packet, wherein the extended time stamp is provided with a particular time unit associated with the particular channel, wherein the first field has a first length configured based on the particular time unit, and wherein the time unit for the extended time stamp is configurable based on a packet rate supported on each of a plurality of different channel types; and
    a second field for a counter value associated with the data packet, wherein the second field has a second length configured based on the time unit of the extended time stamp and a selectable rate of the particular channel.

2. An electronics unit that stores a cryptosync used for secured processing of a data packet for communication on a particular channel in a wireless communication system having a plurality of channels, the cryptosync comprising:

a first field for an extended time stamp associated with the data packet, wherein the extended time stamp is provided with a particular time unit associated with the particular channel, and wherein the first field has a first length configured based on the particular time unit;
a second field for a counter value associated with the data packet, wherein the second field has a second length configured based on the time unit of the extended time stamp and a selectable rate of the particular channel; and
a third field for an identifier of the particular channel via which the data packet is sent.

3. The electronics unit of claim 1, wherein the first and second lengths of the first and second fields in the cryptosync are configureable for each of a plurality of different channel types, and wherein the first and second lengths are negotiated between an access network and an access terminal.

4. The electronics unit of claim 1, wherein the counter value in the second field is reset in conjunction with changes in the extended time stamp in the first field.

5. The electronics unit of claim 1, wherein the extended time stamp is derived based on a time stamp in the data packet.

6. The electronics unit of claim 1, wherein the extended time stamp and counter value uniquely identify each data packet sent via a particular channel.

7. The electronics unit of claim 2, wherein the time unit for the extended time stamp is configurable based on a packet rate supported on each of a plurality of different channel types.

8. An electronics unit that stores a data packet suitable for transmission on a particular channel in a wireless communication system having a plurality of channels, the data packet comprising:
a header including
a first field for a time stamp associated with the data packet, wherein the time stamp is provided with a particular time unit associated with the particular channel, wherein the first field has a first length configured based on the particular time unit, and wherein the time unit for the time stamp is configurable based on a packet rate supported on each of a plurality of different channel types, and
a second field for a counter value associated with the data packet, wherein the second field has a second length configured based on the time unit of the time stamp and a selectable rate of the particular channel; and
a payload with data for the data packet.

9. The electronics unit of claim 8, wherein the header further includes
a third field for an index of a security key used for secured processing of the data packet.

10. The electronics unit of claim 8, wherein the time stamp is indicative of a time instant when the data packet is constructed.

11. The electronics unit of claim 8, wherein the time stamp covers a particular time-span that is selected based on an expected worst case scheduling delay for the data packet.

12. In a wireless communication system having a plurality of channels, a method for generating a cryptosync used for secured processing of a data packet for communication on a particular channel, comprising:
obtaining an extended time stamp associated with the data packet, wherein the extended time stamp is provided with a particular time unit associated with the particular channel, wherein the extended time stamp has a first length configured based on the particular time unit, and wherein the time unit for the extended time stamp is configurable based on a packet rate supported on each of a plurality of different channel types;
obtaining a counter value associated with the data packet, wherein the counter value has a second length configured based on the time unit of the extended time stamp and a selectable rate of the particular channel; and
generating the cryptosync for the data packet based on the extended time stamp and the counter value.

13. The method of claim 12, wherein the extended time stamp is indicative of a time instant when the data packet is constructed.

14. The method of claim 12, wherein the extended time stamp is obtained based on a time stamp included in the data packet.

15. The method of claim 12, wherein the extended time stamp is obtained based on current time provided by a timer.

16. The method of claim 12, wherein the counter value is obtained from the data packet.

17. The method of claim 12, wherein the counter value is obtained from a counter that is reset based on the extended time stamp.

18. The method of claim 12, wherein the wireless communication system is a CDMA system.

19. The method of claim 18, wherein the CDMA system implements IS-856.

20. In a wireless communication system having a plurality of channels, a method for generating a cryptosync used for secured processing of a data packet for communication on a particular channel, comprising:
obtaining an extended time stamp associated with the data packet, wherein the extended time stamp is provided with a particular time unit associated with the particular channel, and wherein the extended time stamp has a first length configured based on the particular time unit;
obtaining a counter value associated with the data packet, wherein the counter value has a second length configured based on the time unit of the extended time stamp and a selectable rate of the particular channel;
obtaining a channel identifier for the particular channel via which the data packet is sent; and
generating the cryptosync for the data packet based on the extended time stamp, the counter value, and the channel identifier.

21. The method of claim 20, wherein the time unit for the extended time stamp is configurable based on a packet rate supported on each of a plurality of different channel types.

22. A computer program product associated with generating a cryptosync used for secured processing of a data packet for communication on a particular channel in a wireless communication system having a plurality of channels, comprising:
a non-transitory computer-usable storage medium, storing:
code to cause a computer to obtain an extended time stamp associated with the data packet, wherein the extended time stamp is provided with a particular time unit associated with the particular channel, wherein the extended time stamp has a first length configured based on the particular time unit, and wherein the time unit for the extended time stamp is configurable based on a packet rate supported on each of a plurality of different channel types;
code to cause a computer to obtain a counter value associated with the data packet, wherein the counter value has a second length configured based on the time unit of the extended time stamp and a selectable rate of the particular channel; and code to cause a computer to generate the cryptosync for the data packet based on the extended time stamp and the counter value.

23. The computer program product of claim 22, wherein the extended time stamp is indicative of a time instant when the data packet is constructed.

24. A transmitter unit in a wireless communication system having a plurality of channels, comprising:
a processor operative to perform secured processing on each data packet based on a respective cryptosync to provide a corresponding secured packet, wherein the cryptosync includes an extended time stamp and a counter value associated with the data packet for communication on a particular channel, wherein the extended time stamp is provided with a particular time unit associated with the particular channel, wherein the extended time stamp has a first length configured based on the particular time unit, wherein the time unit for the extended time stamp is configurable based on a packet rate supported on each of a plurality of different channel types, and wherein the counter value has a second length configured based on the time unit of the extended time stamp and a selectable rate of the particular channel;
an encoder operative to encode each secured packet based on a particular encoding scheme to provide encoded data; and
a modulator operative to modulate the encoded data based on a particular modulation scheme to provided modulated data.

25. The transmitter unit of claim 24, wherein the processor is operative to perform the secured processing on data packets for each channel based on a respective set of one or more protocols configured for the channel.

26. The transmitter unit of claim 24, further comprising:
a buffer operative to store secured packets from the processor prior to transmission, and wherein a time stamp is included in each secured packet and covers a particular time-span selected based on an expected worst case scheduling delay for the secured packet.

27. The transmitter unit of claim 24, further comprising:
a timer operative to provide a time value used to derive the extended time stamp.

28. An access point in a CDMA system comprising the transmitter unit of claim 24.

29. An access terminal in a CDMA system comprising the transmitter unit of claim 24.

30. The transmitter unit of claim 27, further comprising:
a counter configurable to provide the counter value for each data packet.

31. The transmitter unit of claim 30, wherein the counter is reset based on the time value from the timer.

32. A transmitter apparatus in a wireless communication system having a plurality of channels, comprising:
means for obtaining an extended time stamp associated with a data packet for communication on a particular channel, wherein the extended time stamp is provided with a particular time unit associated with the particular channel, wherein the extended time stamp has a first length configured based on the particular time unit, and wherein the time unit for the extended time stamp is configurable based on a packet rate supported on each of a plurality of different channel types;
means for obtaining a counter value associated with the data packet, wherein the counter value has a second length configured based on the time unit of the extended time stamp and a selectable rate of the particular channel;
means for generating a cryptosync for the data packet based on the extended time stamp and the counter value;
means for performing secured processing on the data packet based in part on the cryptosync to provide a corresponding secured packet;
means for encoding the secured packet based on a particular encoding scheme to provide encoded data; and
means for modulating the encoded data based on a particular modulation scheme to provided modulated data.

33. The transmitter apparatus of claim 32, wherein the extended time stamp is indicative of a time instant when the data packet is constructed.

* * * * *